Dec. 30, 1924.
F. A. STEVENS
1,520,978
OPHTHALMIC MOUNTING
Filed May 15, 1922
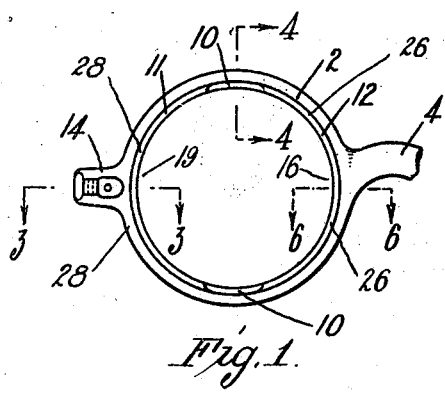
Fig. 1.
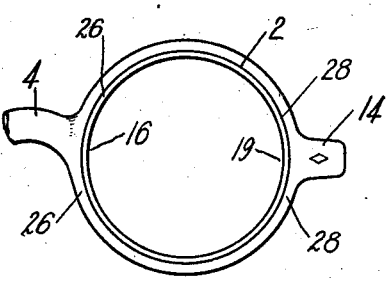
Fig. 2.
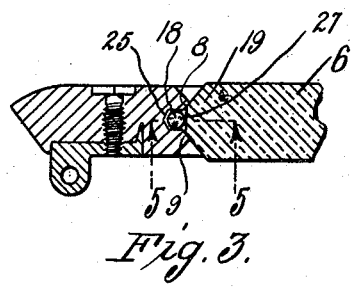
Fig. 3.
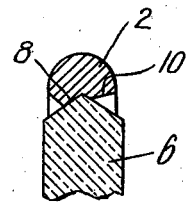
Fig. 4.
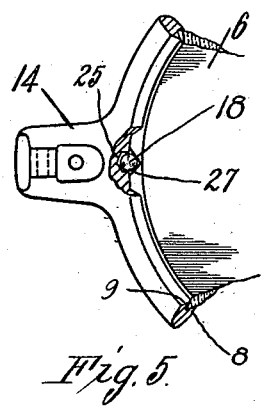
Fig. 5.
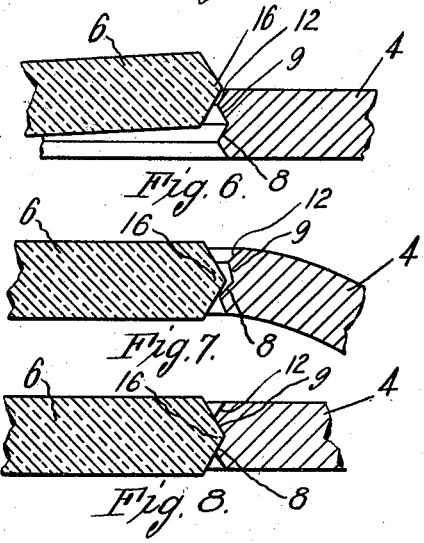
Fig. 6.
Fig. 7.
Fig. 8.
Inventor:-
Frederick A. Stevens
David Rines
Attorney:-

Patented Dec. 30, 1924.

1,520,978

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed May 15, 1922. Serial No. 560,955.

*To all whom it may concern:*

Be it known that I, FREDERICK ARTHUR STEVENS, a citizen of the United States, and a resident of Providence, in the county of Providence and State of Rhode Island, have invented a new and useful Improvement in Ophthalmic Mountings, of which the following is a specification.

The present invention relates to ophthalmic mountings comprising lens-holding rims, and more particularly to mountings of the all-"shell" type, constituted of non-metallic material, like celluloid, zylonite and the like.

As the non-metallic material, though more or less resilient, is not sufficiently so to permit mounting lenses within the endless rims at ordinary temperatures, it is necessary to apply heat, which permits of stretching or expanding the rims to increase temporarily their calibre. This is a drawback, for besides the inconvenience attending the heat application, the mounting may become distorted in consequence; in fact, it frequently cracks as a result.

Endless non-metallic rims have been heretofore proposed so constructed as to permit lenses to be inserted within them by temporarily springing back resilient segmental members that are allowed to return by their resiliency into their normal places after the lens has been forced into its seat. The temporary springing back of the segmental members serves to increase for the moment the calibre of the groove, permitting entry of the lens. Owing to the resilient nature of the segmental members, however, they cannot hold the lens tightly in place, so that additional metal clamping members have been seated in slots of the non-metallic rims to clamp the non-metallic rim against the lens, and thereby prevent accidental rotation of the lens within its seat. The slots serve to decrease the rigidity of the non-metallic rims and to increase their resiliency.

In a copending application, Serial No. 479,480, filed June 22, 1921, there is disclosed and claimed an ophthalmic mounting within the endless rims of which lenses may be tightly, non-rotatably mounted without the necessity of previously expanding or stretching the non-metallic material. The lens-receiving grooves are each provided, on one side, with a wall against which the lens is adapted to rest, the other side of the groove being cut away, or open. This makes it possible to insert within the groove, by way of the open side, a lens of diameter substantially equal to the calibre of the groove. Small clips, that are preferably integral with the body of the mounting, are provided at the open side of the groove to prevent the lens falling out of the groove. In the preferred construction, one clip is provided near the temple end piece, and another near the bridge, though the number, the location and the dimension of the clips may be varied as desired. When integral clips are employed, it is necessary to move one or more of them temporarily aside to permit inserting the lens. This may be effected by temporarily bending or springing back the portion of the rim near the temple end piece, for example, a little out of its plane. The bending or springing is rendered possible by the resilient character of the material of which the mounting is constituted.

The object of the present invention is to provide an improved ophthalmic mounting of the same, general character disclosed in the said application.

In the accompanying drawings, Fig. 1 is a rear elevation of a portion of a spectacle mounting constructed according to a preferred embodiment of the present invention; Fig. 2 is a front elevation of the same; Figs. 3 and 4 are sections taken upon the lines 3—3 and 4—4 of Fig. 1, respectively, looking in the directions of the arrows; Fig. 5 is an elevation, partly in section along the line 5—5 of Fig. 3; and Figs. 6, 7 and 8 are enlarged sections taken upon the line 6—6 of Fig. 1, looking in the direction of the arrows, showing successive steps in the operation of inserting a lens in the mounting of the present invention.

Ophthalmic mountings of the above-described character, constituted of non-metallic material, like celluloid, zylonite and the like, comprise two endless rims 2 (one only is shown in the drawings) integrally connected together by a bridge 4, and each having an integral temple end piece 14. The bridge and the end pieces need not, however, be integral. They may be made of metal or other material and they may be attached to the rims in any well-known manner.

According to the invention of the above-mentioned application, the lens-receiving grooves are each provided on one side with a wall 8, against which the lens is adapted to rest, the other side of the groove being cut away, or open, as shown at 10. This makes it possible to insert within the groove, by way of the open side 10, a lens of diameter substantially equal to the calibre of the groove. In the above-mentioned application, one or more clips are provided at the open side of the groove to prevent the lens falling out of the groove. Somewhat similar retaining means are provided by the present invention, except that the clips are very much longer; so long, in fact, that it is probably more accurate to speak of the present rims as provided with walls 8 and 9 on both sides of the groove, with one of the walls, the wall 9, slightly cut away at 10. Retaining the terminology of the aforesaid application, however, two clips 11 and 12 are illustrated, the clip 11 being shown near the temple end piece 14, and the clip 12 near the bridge 4. The clips are preferably integral with the body of the mounting, and, as shown, are nearly semicircular, leaving one or more comparatively short, cut-away portions 10.

To mount a lens 6 in the lens groove, one side 19 of the lens is first inserted through the cut-away portions 10, and in between the walls 8 and 9, either near the temple end piece 14 or near the bridge 4. It is assumed that the said side 19 of the lens has been inserted between the wall 9 of the clip 11 and the continuous wall 8. The opposite side 16 of the lens will therefore now rest against the clip 12, as shown in Fig. 6. It is necessary to move this clip 12 temporarily aside to permit inserting the lens. This may be effected by temporarily bending or springing back the portion of the rim 2 near the bridge 4 a little out of its plane, as is illustrated in Fig. 7. The bending or springing is rendered possible by the resilient character of the material of which the mounting is constituted. To supply the necessary leverage for the bending or springing action, the end piece 14 and the bridge 4 may be grasped, one in each hand. After the portion of the rim 2 near the bridge 4 has been sprung back by the thumb and fingers, and the edge 16 of the lens 6 has been moved past the clip 12 against the wall 8, as shown in Fig. 7, the portion of the rim 2 near the bridge 4 is allowed to spring or snap back into its plane, with the clip 12 over the edge 16 of the lens, as shown in Fig. 8. The lens is thus readily and conveniently mounted within its groove, and is retained within its groove by the wall 8 engaging one of its faces, and the clips engaging the other face.

As it is unnecessary to distort the rims by heat or otherwise, the mounting will permanently retain its original shape, so that when a properly shaped lens is once properly fitted into a groove of proper size and shape, it will remain properly fitted, neither too loose nor too tight. The dangers of accidental axial derangement of the lens within its groove, caused by the lens being too loose, and of the rim cracking, caused by the lens being too tight in its groove, are thus eliminated. Locking members 18, seated in cooperating recesses 25 and 27, respectively provided in the mounting and the lens, may be employed to lock the lens against accidental rotation in its groove in case the lens is cut of too small diameter; but these are wholly unnecessary if the lens is properly fitted to the calibre of the rim.

It will be noted that the rim 2 is cut away at the comparatively small regions 10 only, at points about midway between the bridge 4 and the temple end piece 14. Everywhere else, the rim 2 is solid and the parts thereof quite rigid. The rims 2 are, furthermore, unslotted, so as to add to their rigidity. One advantage of the comparatively long clips 12 is that they add to this rigidity at the portions 26 and 28 of the rim 2, on each side of the bridge 4 and the temple end piece 14. No additional clamping members of any kind are therefore needed to hold the lens 6 in place in the rim 2. The rigidity of the structure as a whole, lens included, is further increased by the fact that the edge of the lens is enclosed by the walls 8 and 9 throughout a larger portion of the circumference than would be the case if smaller clips were employed.

It will be understood that the invention is not restricted to the exact embodiment thereof that is illustrated in the accompanying drawings and described herein, and that all modifications within the skill of the artisan are considered to be within the spirit and scope of the present invention, as defined in the appended claims.

What is claimed as new is:

1. An ophthalmic mounting comprising an endless rim having a lens-receiving groove provided with walls on both sides of the groove, one of the walls being slightly cut away to permit entry of a lens of dimension substantially equal to the calibre of the groove and the rim being unslotted to render it comparatively rigid.

2. An ophthalmic mounting comprising an endless rim constituted of non-metallic material having a bridge and a temple end piece and a lens-receiving groove provided with walls on both sides of the groove, one of the walls being slightly cut away at a point intermediate the bridge and the temple end piece to permit entry of a lens of dimension substantially equal to the calibre of the groove and the rim being unslotted to render it comparatively rigid.

3. An ophthalmic mounting comprising an endless rim constituted of non-metallic material having integral therewith a bridge and a temple end piece and a lens-receiving groove provided with walls on both sides of the groove, one of the walls being slightly cut away at points about half way between the bridge and the temple end piece to permit entry of a lens of dimension substantially equal to the calibre of the groove and the rim being unslotted to render it comparatively rigid.

4. An ophthalmic mounting comprising an endless rim provided with a lens-receiving groove, the groove having a wall against which the lens is adapted to rest and being open at the side opposite to the wall, and a comparatively long clip at the side opposite to the wall adapted to engage the lens when seated in the groove the rim being unslotted to render it comparatively rigid.

In testimony whereof, I have hereunto subscribed my name this 11th day of May, 1922.

FREDERICK A. STEVENS.